United States Patent [19]

Hale

[11] Patent Number: 4,887,929
[45] Date of Patent: Dec. 19, 1989

[54] CABLE COUPLER

[75] Inventor: C. David Hale, Wilmington, Ohio

[73] Assignee: Electric Eel Manufacturing Co., Inc., Springfield, Ohio

[21] Appl. No.: 185,985

[22] Filed: Apr. 25, 1988

[51] Int. Cl.$^4$ .............................................. F16B 7/00
[52] U.S. Cl. ..................................... 403/328; 403/14; 403/355; 403/354; 279/79; 279/97
[58] Field of Search ............... 403/324, 328, 108, 349, 403/229, 306, 354, 355, 379, 13, 14, 319; 279/79, 97, 76, 93, 1 B, 23 R

[56] References Cited

U.S. PATENT DOCUMENTS

| | | | |
|---|---|---|---|
| 2,696,124 | 12/1954 | Flowers et al. | 403/355 X |
| 2,880,435 | 4/1959 | Deutsch et al. | 403/349 X |
| 2,901,258 | 8/1959 | Brandafi | 279/97 |
| 2,985,457 | 5/1961 | Sima | 279/93 |
| 2,990,189 | 6/1961 | Beers | 403/14 X |
| 3,011,794 | 12/1961 | Vaughn | 403/355 X |
| 3,397,420 | 8/1968 | Schneider | 403/229 X |
| 3,449,003 | 6/1969 | Hunt | 403/324 |
| 3,694,011 | 9/1972 | Silverman | 403/328 X |
| 4,042,305 | 8/1977 | Vincent | 403/328 X |
| 4,508,468 | 4/1985 | Irwin | 403/328 |

Primary Examiner—Andrew V. Kundrat
Assistant Examiner—Peter M. Cuomo
Attorney, Agent, or Firm—Frost & Jacobs

[57] ABSTRACT

A coupler assembly having male and female coupler members, the female coupler member having at least one linear open ended slot therein adapted to receive a drive pin on the male coupler member, the female coupler member also having an annular opening angularly displaced with respect to the linear slot, the male coupler member also having a depressible locking pin adapted to be depressed by the female coupler member as the drive pin is inserted into the linear slot, the locking pin being positioned to enter the annular opening in the female coupler member when the projection reaches the inner end of the slot, thereby locking together the coupler members.

5 Claims, 2 Drawing Sheets

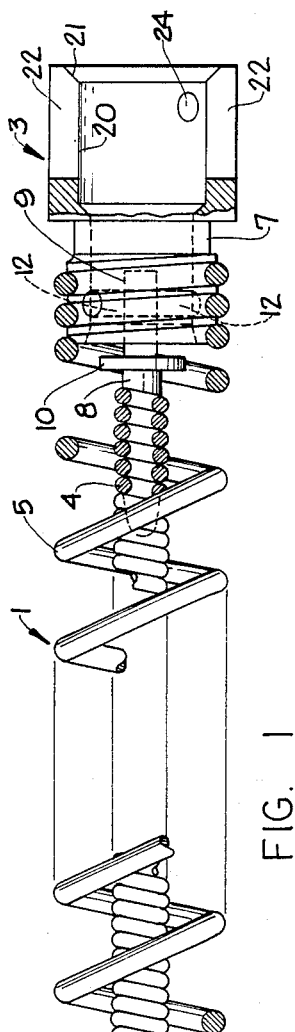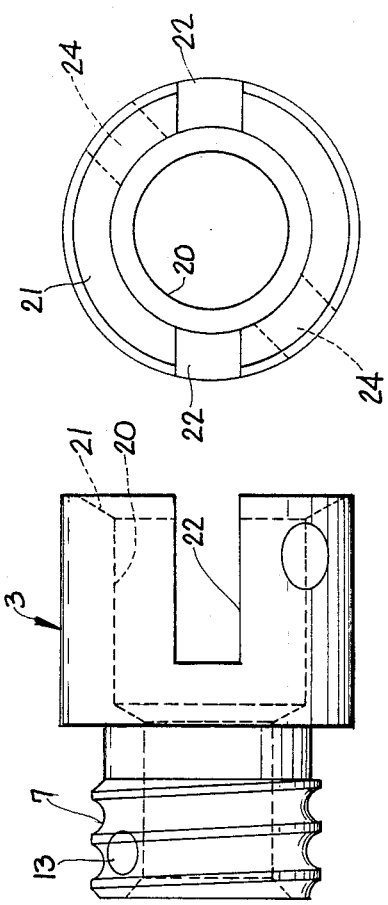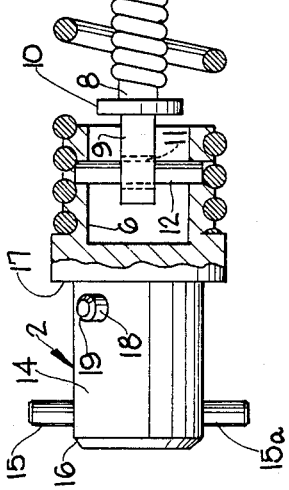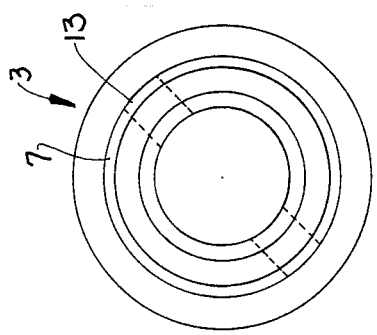

CABLE COUPLER

This invention relates to capable couplers and more particularly to a coupler assembly for connecting together lengths of flexible cable, such as the helical cable used for cleaning sewer pipe.

BACKGROUND OF THE INVENTION

The present invention relates to improvements in the cable couplers taught in U.S. Pat. No. 2,880,435, issued Apr. 7, 1959 and entitled PIPE CLEANING APPARATUS. In accordance with this patent, the coupler comprises a male coupler member adapted to be received in a female coupler member, the female member being provided with an oppositely directed pair of L-shaped bayonet slots adapted to be engaged by opposing drive pins on the male coupler member. In order to ensure locking engagement of the male and female coupler members when in the fully assembled condition, the male coupler member is also provided with a spring biased locking pin positioned to engage in one of the bayonet slots when the coupler members are rotated relative to each other to their fully assembled position.

While cable couplers of the type just described have been in use for many years, they have presented a number of difficulties in the field. Paramount among these difficulties is excessive wear on the spring biased locking pin and on the portions of the bayonet slots contacted by the spring biased locking pin, which ultimately results in accidental disconnection of the male and female coupler members. In this connection, when the couplers are utilized to connect lengths of cable used with sewer cleaning apparatus, the cables are driven forwardly by being rotated in a clockwise direction, in which event the drive pins engaging the closed ends of the laterally extending portions of the bayonet slots transmit the driving forces from one coupler member to the other coupler member. However, when the cables are rotated in the opposite direction, i.e. in a counterclockwise direction, the driving forces are transmitted solely through the spring biased locking pin which is far less capable of withstanding the driving forces than are the solid drive pins.

When it is desired to disengage the coupler members, it is necessary to provide a tool which will depress the spring biased locking pin so as to release it from the longitudinal section of the bayonet slot with which it is engaged, whereupon the coupler members must be rotated relative to each other until the opposing drive pins clear the lateral sections of the bayonet slots. It is then necessary to displace the coupler members axially relative to each other to disconnect them.

While the foregoing difficulties have been known for many years, no satisfactory solution has been proposed to overcome the problems of excessive wear and possible disconnection, or to alleviate the necessity for both axial and rotational movement of the coupler members to effect both coupling and uncoupling of the members.

SUMMARY OF THE INVENTION

In accordance with the present invention, the aforementioned difficulties are overcome by modifying the female coupling member to provide an opposing pair of longitudinally extending, i.e. linear slots of a size to snugly yet slidably receive the opposing ends of the drive pins on the male coupler member. With such arrangement, rotation of the coupler members relative to each other is eliminated, and in addition, the opposing drive pins, which are rigid, serve to drive the coupler member in both the forward and reverse directions, the driving force, irrespective of the direction, being absorbed and transmitted from one coupler member to the other by the drive pins.

In order to lock the male and female coupler members in the fully assembled position, the female coupler member is provided with an opposing pair of annular openings positioned to selectively receive the head of the spring biased locking pin on the male coupler member. Preferably, the openings which receive the spring biased locking pin will have a sufficiently large diameter so that no load is imparted to the spring biased locking pin, irrespective of whether the couplers are being driven in the forward or reverse directions. Thus, the only load which is applied to the spring biased locking pin is a direct pull load, which is normally encountered only when the cable is being withdrawn from a sewer pipe or the like. In this connection, it is pointed out that the drive pins will absorb all push loads, which are normally much greater than the pull loads due to the fact that the push loads will occur when the cable encounters obstructions in a pipe being cleaned which offer resistance to the forward movement of the cable, whereas there is little or no resistance when the cable is being withdrawn.

A further advantage of the present invention lies in the simple push-pull connection and disconnection of the coupler members, and while a simple tool may be provided to depress the spring biased locking pin when it is desired to disconnect the coupler members, the spring biased locking pin may be depressed utilizing any available tool, such as a screwdriver blade or an Allan wrench of a size to be received in the opening in which the head of the locking pin is seated.

A further advantage of the present invention lies in the interchangeability of the coupler members, it being possible to retrofit cables having couplers of the type disclosed in U.S. Pat. No. 2,880,435 with the female coupler members of the present invention.

DESCRIPTION OF THE DRAWINGS

FIG. 1 is a side elevational view with parts broken away of a section of cable with coupler means in accordance with the invention.

FIG. 2 is an enlarged side elevational view of the female coupler member.

FIG. 3 is an end elevational view taken from the right end of FIG. 2.

FIG. 4 is an end elevational view taken from the left side of FIG. 2.

DESCRIPTION OF THE PREFERRED EMBODIMENT

Figure 5:
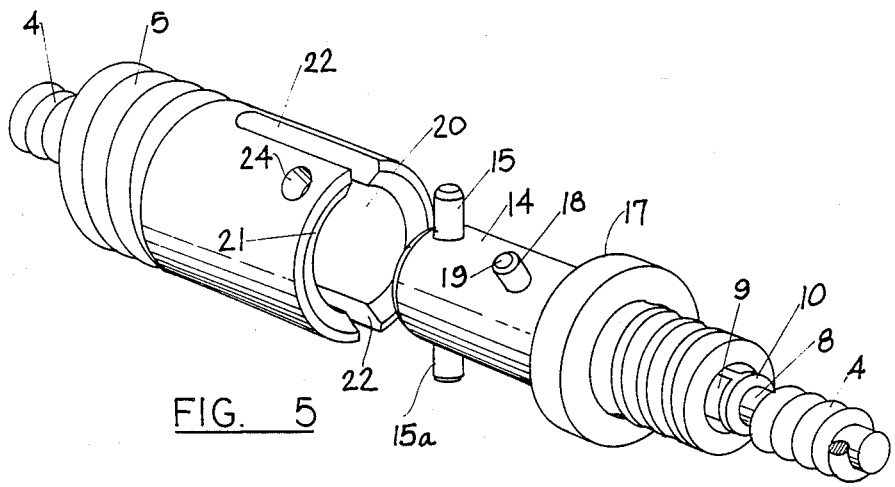
FIG. 5 is a fragmentary perspective view illustrating the cable coupler members prior to their attachment to each other.

Referring to FIG. 1, reference numeral 1 indicates generally a sewer cleaning cable having a male coupler member 2 at one end thereof and a female coupler member 3 at its opposite end. In the embodiment illustrated, the cable 1 comprises an elongated inner helical member 4 surrounded by an elongated outer helical member 5 which is rigidly attached at one end of the male coupler 2 and at the opposite end to the female coupler 3 by means of threaded engagement with a hollow threaded extension 6 on the male coupler 2 and a corresponding hollow threaded extension 7 on the female coupler 3.

The helical member 4 is threadedly connected at each end to a threaded finger 8 terminating at its outermost end in a lug 9 having collar 10. Each of the lugs 9 is provided with an aperture 11 which loosely receives a pin 12, the opposite ends of the pins 12 engaging in opposing apertures 13 (see FIG. 4) in the hollow threaded extensions 6 and 7. The arrangement just described, which is exemplary only and of the type taught in the aforementioned U.S. Pat. No. 2,880,435, provides a limited universal type of connection between the cable members and the male and female coupler members and is not intended to constitute a limitation on the invention.

The male coupler member 2 is provided with a cylindrical portion 14 having a diametrically opposed pair of drive pins 15, 15a projecting outwardly therefrom, the pins 15, 15a being fixedly secured to the cylindrical portion 14 adjacent its outermost end. It will be understood that while the pins 15, 15a may comprise separate pins, a single pin passing through the cylindrical portion 14 may be utilized, but for convenience of reference the projecting pins wil be separately identified.

The cylindrical portion 14 terminates at its outermost end in a tapered portion 16, and at its innermost end in a flange or shoulder 17. The cylindrical portion 14 is also provided with a spring-based locking pin 18 having a tapered head 19, the locking pin being spring-biased outwardly to its extended position, the locking pin being displaceable inwardly. As will be evident from FIGS. 1 and 5, the locking pin is angularly disposed with respect to the drive pins 15, 15a.

In accordance with the invention, the female coupler member 3 is provided with a socket 20 of the size to receive the cylindrical portion 14 of the male coupler member 2, the mouth of the socket 20 being tapered, as shown at 21, the taper 21 coacting with the tapered portion 16 on the end cylindrical portion 14 to facilitate insertion of the cylindrical portion 14 into the socket 20. The female coupler is provided with diametrically opposed linear slots 22 adapted to receive the drive pins 15, 15a, the width of the slots 22 being such that they will slidable yet snugly receive the drive pins 15, 15a. The length of the slots is such that the drive pins 15, 15a will coincide with the innermost ends of the slots when the shoulder 17 of the male coupler member 2 seats against the outermost end of the female coupler member 3.

The female coupler member 3 is also provided with a diametrically opposite pair of annular openings 24 which are angularly disposed with respect to the linear slots 22 and positioned to alternatively receive the locking pin 18 when the coupler members are fully engaged.

Figure 6:
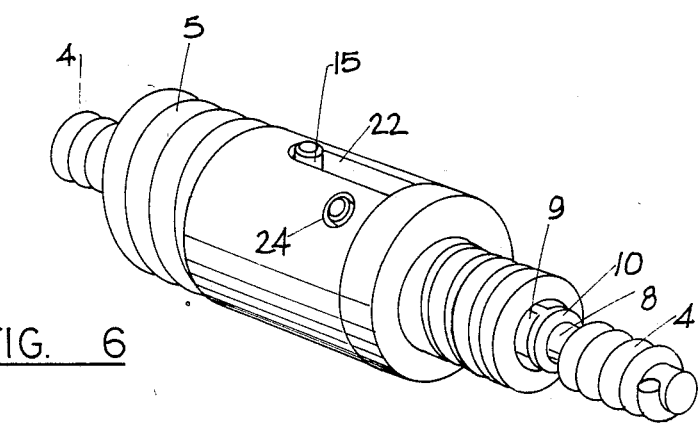
FIG. 6 is a perspective view similar to FIG. 5 showing the cable coupler members in attached condition.

As the coupler members are moved from the position illustrated in FIG. 5 to the position shown in FIG. 6, the drive pins 15, 15a will enter the slots 22 and as inward movement continues, the tapered head 19 of locking pin 18 will engage and be cammed inwardly by the taper 21 at the mouth of recess 20, the locking pin thus being depressed as it enters into the recess 20, the locking pin being released for outward movement when it coincides with one of the annular openings 24, depending upon the orientation of the drive pins 15, 15a relative to the slots 20. Preferably, the annular openings 20 will be larger than the locking pin 18 so that the locking pin will be loosely received in the annular openings. With this arrangement, all rotative forces applied to the coupling members will be transmitted from one member to the other through the drive pins, and the only time forces will be exerted against the locking pin will be when a pulling force is exerted on the coupler members.

When it is desired to disconnect the coupler members, it is only necessary to depress the locking pin 18, as by means of a screwdriver blade or other similar instrument, whereupon the coupler members can be axially separated. If desired, a wrench similar to that disclosed in the aforementioned U.S. Pat. No. 2,880,435 may be used, the projection on the wrench being sized to engage in the annular opening 24 and hence depress the locking pin 18 to permit axial separation of the coupler members.

What is claimed is:

1. A cable coupler assembly comprising male and female coupler members, said female coupler member having a cylindrical wall at one end thereof defining an open ended socket, a pair of diametrically opposite linear slots in said cylindrical wall extending axially of said cylindrical wall in parallel relation to each other, said slots being open at the open end of said socket and closed at their opposite ends, at least one annular opening in said cylindrical wall, said annular opening being angularly disposed with respect to said linear slots, said male coupler member having a cylindrical body of a size to be slidably received in the socket in said female coupler member, a diametrically opposed pair of rigid drive pins projecting outwardly from said cylindrical body, said drive pins being of a size to be slidably received in the linear slots in said female coupler member, a spring-biased locking pin having a head projecting outwardly from the cylindrical body of said male coupler member, said locking pin being angularly displaced with respect to said rigid drive pins and positioned to engage in the annular opening in said female coupler member when said male coupler member is inserted in said female coupler member with said opposing drive pins at the innermost ends of said linear slots, said spring-biased locking pin being adapted to be depressed by the cylindrical wall of said female coupler member as the male coupler member is inserted therein.

2. The coupler assembly claimed in claim 1 wherein a pair of diametrically opposite openings are provided in said female coupler member, said openings being adapted to selectively receive the head of said locking pin.

3. The coupler assembly claimed in claim 2 wherein the annular openings in said female coupler member are larger than the head of said locking pin, whereby the head of said locking pin lies in spaced relation to the annular opening in which it is received.

4. The coupler assembly claimed in claim 1 wherein the cylindrical wall of said female coupler member has a beveled edge surrounding the open end of said socket, whereby said beveled edge will cam the head of said locking pin inwardly as said male coupler member is inserted in said female coupler member.

5. The coupler assembly claimed in claim 1 wherein said diametrically opposed rigid drive pins comprise a unitary pin member extending through the cylindrical body of said male coupler member.

* * * * *